United States Patent [19]

Hsieh et al.

[11] Patent Number: 4,923,649
[45] Date of Patent: May 8, 1990

[54] PELLETIZING POLYMERS

[75] Inventors: Eric T. Hsieh; Gene H. C. Yeh; John R. Donaldson, all of Bartlesville, Okla.

[73] Assignee: Phillips Petroleum Company, Bartlesville, Okla.

[21] Appl. No.: 836,884

[22] Filed: Mar. 6, 1986

[51] Int. Cl.$^5$ .............. B29B 9/08; B29B 9/10
[52] U.S. Cl. .................... 264/37; 264/15; 264/570; 264/117; 264/349
[58] Field of Search ........... 264/15, 6, 9, 117, 13, 264/14, 37, 570, 349

[56] References Cited

U.S. PATENT DOCUMENTS

| | | | |
|---|---|---|---|
| 2,945,020 | 7/1960 | Hall | 528/493 |
| 2,952,868 | 9/1960 | Rowan | 264/15 |
| 3,008,946 | 11/1961 | Rhodes et al. | 528/493 |
| 3,063,099 | 11/1962 | Turner et al. | 264/15 |
| 3,244,687 | 4/1966 | Spindler | 528/494 |
| 3,563,975 | 2/1971 | Zarasnik | 528/501 |
| 3,586,654 | 6/1971 | Lerman et al. | 264/117 X |
| 3,622,555 | 11/1971 | Rothenburk et al. | 528/491 |
| 3,674,736 | 7/1972 | Lerman et al. | 264/15 X |
| 3,896,196 | 7/1975 | Dickey et al. | 264/6 |
| 4,420,443 | 12/1983 | Kaji et al. | 264/15 |

Primary Examiner—Jan H. Silbaugh
Assistant Examiner—Mary Lynn Fertig
Attorney, Agent, or Firm—A. W. Umphlett

[57] ABSTRACT

A method of pelletizing polymer utilizing a liquid medium characterized in that the liquid medium boils at a temperature greater than the melting temperature of the polymer and is immiscible with the molten polymer so that (1) polymer can be heated in the liquid medium to a temperature that causes particulates to melt, (2) the melted polymer can be allowed to agglomerate and (3) the agglomerated polymer can be cooled in a liquid to form pellets.

18 Claims, 2 Drawing Sheets

PELLETIZING POLYMERS

BACKGROUND OF THE INVENTION

This invention relates to the pelletizing of polymers. In particular it relates to a process for pelletizing thermoplastic polymer fluff or powder. It further relates to the use of nonsolvents to cause the pelletization of thermoplastic polymer fluff.

Fluff, a dry, fine solid, is typically the form which polymer takes when recovered from a polymerization reactor. It is conventionally pelletized through an extrusion process. The fluff is melted and then extruded through a die into strands which are cut into pellets. This process has several disadvantages. The first disadvantage is that the polymer is subjected to nonuniform heating during the processing which causes the polymer to thermally degrade. Another problem is that the presence of air or oxygen can cause the polymer to oxidize. Polymers are also subjected to high mechanical shear in extrusion processes, which causes mechanical degradation of the polymer, especially of high molecular weight polymers such as ultra high molecular weight polyethylene (UHMWPE). Another problem is high energy cost in heating the polymer. The heating process is very energy intensive and practically none of the heat provided to melt the polymer is recovered.

The instant invention solves many of these problems by heating polymer fluff in a liquid, inert medium. The medium provides uniform heating of the polymer. It also provides heating of the polymer in the absence of air or oxygen so that no oxidation is possible. The instant invention also uses no mechanical shear to form the pellets and uses less energy to form the pellets.

An object of this invention is, therefore, to provide a new method of pelletizing polymer fluff.

Another object of this invention is to pelletize polymer fluff without mechanical degradation of the polymer while minimizing or eliminating thermal degradation of the polymer.

Another object of this invention is to provide a means of pelletizing polymer fluff in the absence of air or oxygen.

A particular object of this invention is to provide a more efficient means for pelletizing thermoplastic polymer fluff.

Other objects of this invention will become apparent from the following disclosure.

SUMMARY OF INVENTION

According to the instant invention, polymer in the form of fluff or powder is dispersed and wetted in a vessel containing one or more liquid mediums. Liquids useful in the invention have specific properties such that the fluff can be melted, agglomerated and cooled into solid pellets. In one embodiment of this invention the liquid medium has a lower density than the melted polymer fluff. In this embodiment the molten polymer particles sink through the liquid medium. In another embodiment, the density of the liquid medium(s) is greater than that of the molten polymer particles and the polymer rises to the top.

As the polymer fluff passes through the liquid(s), it is subjected to heating. This causes the polymer to melt into droplets. Agitation or other mixing means, e.g., convection, can be used to bring the droplets together to form larger drops. The molten drops are then passed through a liquid that is sufficiently cool that the drops form solid pellets. These pellets can then be recovered using any conventional liquid/solid separation means.

DETAILED DESCRIPTION OF INVENTION

Figure 3:
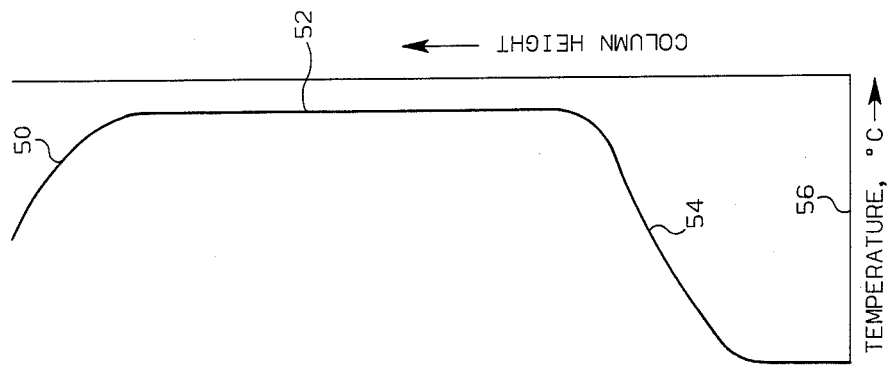

Any thermoplastic polymer fluff or any material used as a precursor to pellets can be utilized in this invention. The general types of polymers useful include polyolefins and polystyrenes. This invention is particularly useful with thermoplastic polymers that tend to degrade through the use of conventional extrusion processes. Gas phase linear low density polyethylene (LLDPE) and ultra high molecular weight polyethylene (UHMWPE) are preferred polymers for use in this invention.

Any liquid medium inert to the polymers can be used. The liquid medium can be a pure compound or a mixture of compounds. The liquid must possess at least the following characteristics; it must have a boiling point or be used under elevated pressure conditions that raise the boiling point above the melting point of the polymer fluff. If two or more liquids are used, it is only necessary that at least one has a boiling point higher than the melting point of the polymer. Useful liquids must be a nonsolvent of the polymer. Liquid used with melted polymer must also be immiscible with the molten polymer. If floatation is used to separate the pelletized polymer, the liquid must have a density that is either lower or higher than the polymer fluff.

The general types of liquids for use as a melting medium for polymer fluff can vary depending on polymer type and separation means. With high molecular weight polyolefins the fluff is fed into the upper portion of the vessel and recovered below. In this circumstance useful liquids include alcohols such as 2-octanol, 2-ethyl-1-hexanol and 1-decanol; ketones such as 2-octanone; siloxanes such as octamethyl trisiloxane and amines such as NN diethyl 1-3 propanediamine. If the resin is fed into the lower portion of the vessel and recovered at a higher point useful liquids include organic phosphates such as Diphenyl-t-butyl phenyl phosphate; ketones such as 4-chlorophenyl acetone; substituted aromatic hydrocarbons such as nitrobenzene, and polysiloxanes such as polymethyl- 3,3,3-trifluoropropyl siloxane.

The general type of liquid for use as a cooling medium for the fluff in a two-liquid system also depends both on the polymer type and requires that the cooling medium be of a different density and immiscible with the melting medium. With polyolefins and the above liquid melting mediums water is the preferred cooling liquid medium.

In the first step of the process, the polymer fluff is dispersed in the liquid medium using any conventional means of dispersal. Optionally the fluff can be premixed and preheated in an amount of the melting medium prior to feeding into the vessel. The fluff is then heated in the liquid medium until the polymer melts. The liquid melting medium provides uniform heating in the absence of air or oxygen. The fluff is present as tiny melted particles suspended in the liquid medium. Agitation can be provided through any conventional means to allow the melted particulate polymer to coalesce (agglomerate) into droplets. The droplets are allowed to agglomerate until they reach a desired pellet size and then the polymer is cooled into solid pellets and recovered.

Figure 1:
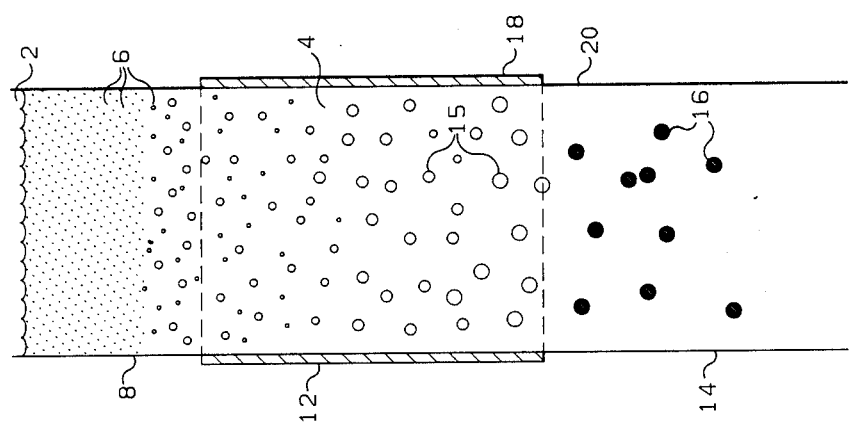

In one preferred embodiment of this invention, shown in FIG. 1, the liquid medium will have a lower density than that of the polymer. In this embodiment, the polymer fluff 6 is introduced into the upper portion 2 of a column of liquid 4. The fluff 6 sinks. The temperature of the upper portion liquid melting medium 8 in the column is maintained above the melting point of the fluff. The fluff particles melt and agglomerate in this upper portion until upon reaching the middle portion 12 of the column, relatively large drops 15 have formed. Agitation can be provided in this portion of the column. As the drops continue to fall they pass through a portion of the liquid maintained at a temperature below the melting point of the polymer so that they are cooled into pellets 16 and collected at the bottom 14 of the column. The heating means 18 for the column can be any conventional heating means, such as a jacket containing heating fluid or electric heating tape wrapped around the column 20.

Figure 2:
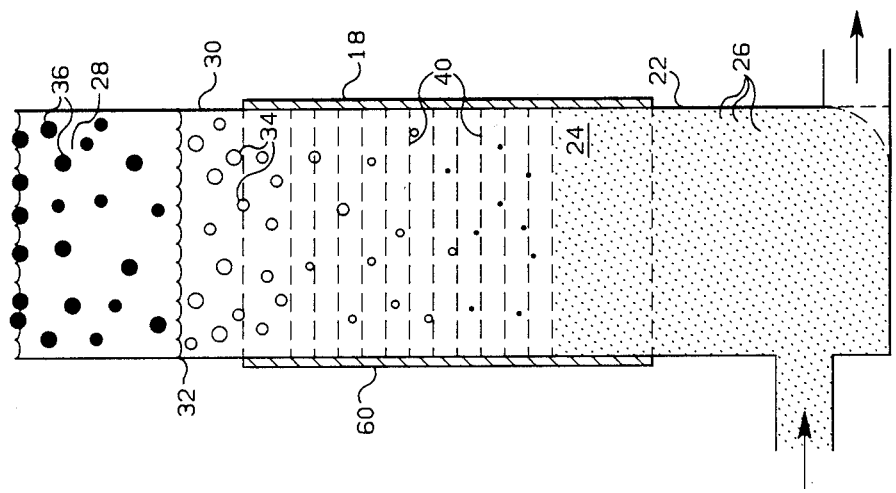

In a second embodiment, shown in FIG. 2, the liquid medium 24 has a greater density than the polymer fluff 26. In this embodiment the fluff 26 is introduced into the lower portion 22 of the column 30 and rises to the top.

A second liquid 28 is also present in the preferred method of this embodiment. This second liquid 28 is immiscible with the first liquid 24 and the molten polymer. Its density is less than the density of the first liquid 25 and greater than the density of the polymer. The second liquid will in the most preferred embodiment have a boiling point below the melting point of the polymer.

This restriction of second liquid boiling point is not, however, critical for the operation of the invention. An example of using a two liquid medium system is illustrated in FIG. 2. In FIG. 2, the polymer fluff 26 is introduced into the lower portion 22 of the column 30 in the first liquid 24. The polymer melts, agglomerates into drops 34 and rises through the column to the interface 32 of the first liquid 24 and second liquid 28. Agitation can be provided in the first liquid 24 zone. If the second liquid 28, has a lower boiling point than the melting point of the polymer, the second liquid will boil at the interface 32 of the two liquids. The second liquid cools the polymer drops 34 into pellets 36 or beads. The pellets 36 having a lower density than the second liquid rise through the second liquid 28 which is of sufficient volume to remain cooler than the melting temperature of the polymer. Screens 40 can be placed in the first liquid 24 of column 30 to slow the rate of rise of the melted polymer and to help regulate the size of the resultant pellets. The more numerous the screens the slower the flow of melted polymer. The finer the screen mesh the smaller the pellet size.

The temperature of the liquid melting medium will generally range from about 120° C. to about 250° C. and preferably will range from about 140° C. to about 180° C. The temperature of the cooling contacting liquid for the two-liquid embodiment will generally range from about 25° C. to about 100° C. and preferably from about 25° C. to 75° C. According to the temperature differential between the melting liquid boiling point and polymer melting point preferably being about 30° C., the contacting time will be about 5 min. The agitation speed can range from 0 to fast, with faster speeds causing quicker agglomeration of the droplets. Too fast, however, can cause an aeration effect.

Regardless of the possible variation in process design, the novelty of this idea centers upon the use of specific characteristics of a liquid medium to pelletize polymer fluff without resorting to conventional extrusion techniques. If one prefers to use separation techniques such as filtering in which a specific size meshed screen filters the pellets from the liquid, the density requirements discussed above need not be limiting. The liquid medium could be flowed in a closed loop with heating at the inlet and cooling at the outlet. This would be more energy intensive and require more elaborate removal means since the pellets would have to be removed from the screens. Small size pellets would be recycled to form larger pellets. The following examples are given to illustrate the operation of the invention without unduly limiting the scope.

EXAMPLE

This example is illustrated in FIGS. 1 and 3.

A vertical glass column (burret) was used to hold the liquid medium. N,N-diethyl-1,3-propanediamine (DEPA) which has a boiling point of 159° C. at 1 atm and a density of 0.826 g/cc at room temperature was chosen as the liquid medium. The polymer fluff used in separate runs was UHMWPE and LLDPE.

The column was essentially divided into three zones according to the function of each zone. The uppermost zone 8 was a rather short convection zone. In this zone, the temperature increased from slightly below the polymer melting point of about 120° C. at the top of the zone to slightly above the polymer melting point at the lower end of the zone. In a height versus temperature curve for the column shown in FIG. 3 the uppermost zone 50 showed an increase in temperature over the zone height from below the boiling point 56 of the polymer to above the boiling point. The temperature in this zone was controlled entirely by the convection flow of heat input from melting zone 12 directly below, and the output of heat used to melt of the fluff.

The intermediate zone 12 was a melting zone which covered the upper half of the column except for the convection zone. The intermediate zone was heated by an external heat source, heating tape wrapped around the outside of the column. The temperature was set and maintained at around 130° C. The second zone 52 in FIG. 3 showed a nearly constant temperature above the boiling point of the polymer over the height of the entire zone.

The lower half of the column was the cooling zone 14. The majority of the liquid in this zone was at room temperature (about 25° C.). The lowermost zone 54 in FIG. 3 shows a decrease in temperature to room temperature over the height of the zone.

Fluff was added into the column from the uppermost portion. It is preferred that the fluff and the liquid be premixed to prevent the formation of small air bubbles which could form and rise to the surface carrying fluff with them due to air trapped within fluff particles. The white fluff, which began settling because of its density, turned from its solid opaque state into clear, colorless, tiny melt particulates about midway into the convection zone.

The density of the fluff melt, should have caused a natural descending motion of the fluff, but, because the convection zone was not directly heated, melting of the fluff decreased the temperature of the zone below that of the melting zone inducing convection flow of the liquid. The motion of the small melt particles was dominated by the convection flow. The small melt particulates moved up and down the two upper zones merging with other melt particulates. A natural agitation and coalescense process was evident. The number of melt particulates was found to decrease with time, growing into melt droplets.

When the melt droplets became large and heavy enough to overcome the upward carrying force of the convection flow, their descent brought them into the cooling zone. In this zone the melt droplets turned into solid polymer beads which, due to their increase in density with solidification, quickly sank to the bottom of the column. This also "gave back" the heat of fusion to the liquid medium, conserving energy.

The beads formed were intermittently removed through a valve in the bottom of the burret. They averaged about 2 to 3 mm in diameter.

It was found in one run using LLDPE fluff that N,N-diethyl-1,3-propane-diamine dissolved some of the low molecular weight, highly branched molecules of the LLDPE employed. Consequently, it was necessary to renew the liquid medium occasionally to maintain the necessary density difference between the liquid medium and the polymer melt.

A way to renew the liquid medium is to remove a slip stream from the column in the zone in which melting takes place. The removed liquid is then cooled to precipitate the polymer. The polymer is then removed by any conventional means, such as centrifugation or filtration and the liquid is be reheated and recycled to the column.

Alternatively, if the density of the liquid medium were increased to the point at which efficiency of the process is diminished to undesirable levels, e.g., the solid pellets do not readily sink through the liquid, the process is terminated and the entire column of liquid medium is cooled and precipitated polymer removed.

N,N-diethyl-1,3-propanediamine was a satisfactory liquid medium in a second run using UHMWPE fluff. None of the fluff dissolved in the diamine. In this run, as before, beads were formed which averaged about 2 to 3 mm in diameter.

CALCULATED EXAMPLE

This example is used to illustrate the two liquid embodiment of the invention. A glass column is employed which has two openings near the bottom which are equipped with valves. One opening is used to flush in prewetted polymer fluff. The second opening is used as the outlet for the denser liquid to maintain the same liquid level in the column. The outlet is covered with several layers of glass wool or stainless steel screen to prevent the polymer fluff from being flushed out along with the denser liquid. Approximately the lower ¾ of the column is filled with poly(methyl-3,3,3-trifluropropylsiloxane) as the first liquid medium which is also used as the denser liquid for transferring the polymer fluff. This is a liquid polymer having no precise boiling point and little or no vapor pressure at 140° C. It has a density of 1.25 g/cc at room temperature. The polymer used in this example is UHMWPE. The liquid fluorine substituted polysiloxane does not dissolve the UHMWPE, and it is immiscible with the molten UHMWPE and with water. Water is used as the second liquid to fill the top portion of the column. It is immiscible with the liquid below and is of lower density than the first liquid but has greater density than the polymer. It, therefore, remains at the top portion of the column.

The polymer particles having a lower density then the liquids rise to the top of the column. To slow down their rising motion a stack of screens, having openings of about 3–10 mm is placed in the middle portion of the column. External heat is also applied in this middle portion of the column. Screens useful in this invention could be made of TEFLON-tetrafluoroethlyene polymer from E. I. Du Pont de Nemour, Wilmington, Del., polymer-coated metal or an equivalent material, such as RYTON-poly (phenylene sulfide) from Phillips Petroleum Company, Bartlesville, Okla. A polymer having substantially higher melting point than the polymer to be pelleted is necessary for coating metal screens. A suitable polymer for use with polyethylene is polyphenylene sulfide as disclosed in U.S. Pat. No. 3,354,129.

Figure 4:
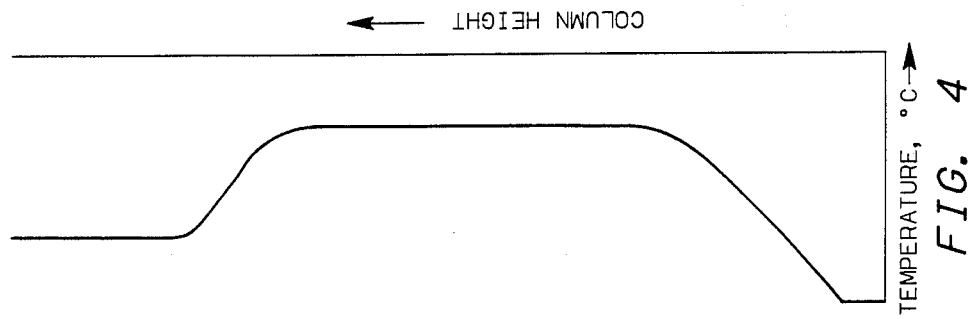

This example is illustrated in FIGS. 2 and 4. FIG. 4 is a height versus temperature curve for the apparatus of FIG. 2.

Prewet UHMWPE polymer fluff is flushed in the column through the valve in the bottom and rises quickly through the lower zone 22 of first liquid 24 into the middle zone 60 of first liquid 24 containing the screens 40. The liquid temperature in the middle zone is kept near 130° C. by external heating. In this zone the fluff melts and continues to rise through the holes in the TEFLON screens. Boiling occurs at the interface between the second liquid and the upper zone of first liquid at which water, the second liquid, is in contact with the first liquid. This boiling maintains the top portion of the column at about 100° C., a temperature below the melting point of the polymer.

Water is chosen as the liquid for this purpose for reasons previously cited. It also allows the polymer melt spheres to stay in their spherical shape when solidifying. In addition, water is cheap and steam provides a form of reusable energy.

The boiling water also reduces the temperature of the first liquid near the interface which is indirectly heated by the hotter first liquid in the lower section of the middle zone of first liquid through a convection flow. The actual temperature in the upper zone of the first liquid varies from about 130° C. to near 100° C. when tranversing upwards and thus provides a graduated solidification of the polymer melt.

Most pellets are actually formed in the upper zone of the first liquid near the interface rather than in the second liquid zone which allows recovery of most of the heat for melting purposes.

The depth of the upper zone of the first liquid between the interface and the screen section of the middle zone of the first liquid allows some control of the convection current which in turn allows more agglomeration of molten polymer particles in these zones to form larger spheres (drops). The TEFLON screens are cross-stacked in the middle zone for maximizing the slowing down effect. Since the molten polymer droplets have to pass through the holes in the screen, the screens also serve the purpose of allowing the polymer droplets to merge with one another. The screens help determine final pellet size to some extent by allowing more time for the molten polymer particles to agglomerate. The convection flow also enhances this process.

The major function of the zone near the interface is primarily for recovering heat for melting incoming fluff minimizing energy consumption. Pellets automatically rise to the top of the column and overflow into the collecting vessel where they can be passed to a recovery zone for separation of pellets and water.

This example illustrates a different process design than employed in Example 1. The process provides a similar high energy efficiency, but has a higher net energy consumption then the process of Example 1.

However, both designs require the use of less energy and provide better polymer protection than conventional extrusion processes.

We claim:

1. A method for pelletizing polymer particulates comprising (1) dispensing polymer in the form of fluff or powder in a vessel containing a liquid that (a) is not miscible with said polymer, (b) has a boiling point that is at a temperature greater than the melting point of said polymer and (c) has a density greater than the density of said polymer so that said polymer rises through said liquid, (2) heating a zone of said liquid to a temperature greater than the melting point of said polymer thereby producing molten polymer particulates and allowing said molten polymer particulates to agglomerate into drops, (3) allowing said drops to pass through a zone of unheated liquid thereby cooling said drops into solid pellets and (4) recovering said pellets.

2. A method according to claim 1 wherein said polymer is polyethylene.

3. A method according to claim 1 wherein said liquid is diphenyl-t-butyl phenyl phosphate.

4. A method according to claim 1 wherein said liquid is 4, chlorophenyl acetone.

5. A method according to claim 1 wherein said liquid is nitrobenzene.

6. A method according to claim 1 wherein said liquid is polymethyl 3,3,3-trifluropropylsiloxane.

7. A method according to claim 1 wherein heating said liquid is accomplished by using one of electric heating tape, jacketed heating fluid or a heating coil.

8. A method according to claim 1 wherein said fluff is agitated to agglomerate it into drops.

9. A method according to claim 1 wherein said liquid can be renewed by (1) separating a portion of said liquid, (2) cooling said portion, (3) separating precipatated polymer from said cooled portion and (4) returning said portion to said liquid.

10. A method according to claim 1 wherein said precipitated polymer is separated from said liquid by filtration means.

11. A method for pelletizing polymer particulates comprising (1) dispersing polymer in the form of fluff or powder in a vessel containing at least two liquids (a) both of which are not miscible with (i) said polymer and (ii) with each other, and wherein said second liquid has a density grater than said first liquid and (b) at least one of which has a boiling point that is at a temperature greater than the melting point of said polymer, (2) heating a zone of said liquid having a boiling point that is at a temperature greater than the melting point of said polymer to a temperature greater than the melting point of said polymer thereby producing molten polymer particulates and allowing said molten polymer particulates to agglomerate into drops, (3) allowing said drops to pass through a zone of unheated liquid thereby cooling said drops into solid pellets and (4) recovering said pellets.

12. A method according to claim 11 wherein the second liquid is water.

13. A method according to claim 11 wherein said first liquid is selected from a group consisting of 2-octanone, octamethyltrisiloxane, NN diethyl-1-,3-propanediamine, 2-octanol, 2-ethyl-1-hexanol, 1-decanol, diphenyl-t-butyl phenyl phosphate, 4,chlorophenyl acetone, nitrobenzene and polymethyl-3,3,3-trifluropropylsiloxane.

14. A method according to claim 11 where said polymer is selected from linear low density polyethylene and ultra high molecular weight polyethylene.

15. A method according to claim 11 wherein there are means for impeding polymer movement within said liquid.

16. A method according to claim 15 where said means for impeding comprises tetrafluoroethylene or RYTON-poly(phenylene sulfide) coated screens.

17. A method according to claim 11 where said liquid can be renewed by (1) separating a portion of said liquid, (2) cooling said portion (3) separating precipatated polymer from said cooled portion and (4) returning said portion to said liquid.

18. A method according to claim 11 wherein said precipitated polymer is separated from said liquid by filtration means.

* * * * *

UNITED STATES PATENT AND TRADEMARK OFFICE
CERTIFICATE OF CORRECTION

PATENT NO. : 4,923,649

DATED      : MAY 8, 1990

INVENTOR(S) : ERIC T. HSIEH; GENE H. C. YEH; JOHN R. DONALDSON

It is certified that error appears in the above-identified patent and that said Letters Patent is hereby corrected as shown below:

CLAIM 16, COLUMN 8, LINES 33 and 34, "RYTON-"SHOULD BE REMOVED.

CLAIM 18, COLUMN 8, LINE 40 "11" SHOULD BE REMOVED AND "17" INSERTED.

Signed and Sealed this

Tenth Day of November, 1992

Attest:

DOUGLAS B. COMER

*Attesting Officer*  *Acting Commissioner of Patents and Trademarks*